US012691315B2

(12) United States Patent
Cogswell

(10) Patent No.: US 12,691,315 B2
(45) Date of Patent: Jul. 28, 2026

(54) QUICK CONNECT SPRINKLER

(71) Applicant: Tyco Fire Products LP, Lansdale, PA (US)

(72) Inventor: Jeremy Cogswell, Johnston, RI (US)

(73) Assignee: Tyco Fire Products LP, Cranston, RI (US)

(*) Notice: Subject to any disclaimer, the term of this patent is extended or adjusted under 35 U.S.C. 154(b) by 351 days.

(21) Appl. No.: 17/796,852

(22) PCT Filed: Mar. 17, 2021

(86) PCT No.: PCT/IB2021/052246

§ 371 (c)(1),
(2) Date: Aug. 1, 2022

(87) PCT Pub. No.: WO2021/186369

PCT Pub. Date: Sep. 23, 2021

(65) Prior Publication Data

US 2023/0054235 A1 Feb. 23, 2023

Related U.S. Application Data

(60) Provisional application No. 62/991,920, filed on Mar. 19, 2020.

(51) Int. Cl.
*A62C 35/68* (2006.01)
*A62C 37/08* (2006.01)

(52) U.S. Cl.
CPC .............. *A62C 35/68* (2013.01); *A62C 37/08* (2013.01)

(58) Field of Classification Search
CPC ....... A62C 35/68; A62C 37/08; F16L 25/009; F16L 37/252; F16L 15/006; F16L 19/02;
(Continued)

(56) References Cited

U.S. PATENT DOCUMENTS 179,092 A * 6/1876 Booth et al. ............ F16L 37/23 137/322
5,609,370 A * 3/1997 Szabo ................. F16L 37/0985 285/921
(Continued)

FOREIGN PATENT DOCUMENTS

JP 2004357981 A * 12/2004 ............ A62C 35/68
JP 2009-291359 A 12/2009
(Continued)

OTHER PUBLICATIONS

Korean Intellectual Property Office as International Searching Authority; International Search Report and Written Opinion; International Application No. PCT/IB2021/052246; mailed Jun. 17, 2021; 8 pages.

*Primary Examiner* — Tuongminh N Pham
(74) *Attorney, Agent, or Firm* — Foley & Lardner LLP

(57) ABSTRACT

A coupling assembly includes a sprinkler and a fitting. The sprinkler includes an inlet end defining a sprinkler interface on a protrusion. The fitting extends from a first end that receives the pipe to a second end that includes a fitting interface. The inlet end of the sprinkler couples with the second end and the fitting interface of the fitting couples with the sprinkler interface. The fitting interface and the sprinkler interface limit rotation of the sprinkler relative to the fitting and form a fluid seal between the fitting and the sprinkler.

9 Claims, 8 Drawing Sheets

(58) Field of Classification Search
CPC ......... F16L 17/02; F16L 37/505; F16L 37/48; F16L 15/008
See application file for complete search history.

(56) References Cited

U.S. PATENT DOCUMENTS

| | | | | |
|---|---|---|---|---|
| 5,957,508 | A * | 9/1999 | Rief | F16L 41/10 277/609 |
| 2008/0012327 | A1 * | 1/2008 | Spears | F16L 27/08 285/355 |
| 2010/0176258 | A1 | 7/2010 | Oh | |
| 2012/0186832 | A1 * | 7/2012 | Orr | A62C 35/00 169/37 |
| 2018/0056318 | A1 | 3/2018 | Jackson | |
| 2018/0280744 | A1 * | 10/2018 | Walcome | F16K 11/14 |

FOREIGN PATENT DOCUMENTS

| | | | | |
|---|---|---|---|---|
| KR | 10-2004-0108608 | A | 12/2004 | |
| KR | 10-2010-0092584 | A | 8/2010 | |
| KR | 20180090466 | A * | 8/2018 | A62C 31/28 |
| WO | WO-2019/051279 | A1 | 3/2019 | |
| WO | WO-2022/178179 | A1 | 8/2022 | |

* cited by examiner

QUICK CONNECT SPRINKLER

CROSS-REFERENCE TO RELATED APPLICATIONS

The present application claims the benefit of and priority to U.S. Provisional Application No. 62/991,920, filed Mar. 19, 2020, the disclosure of which is incorporated herein by reference in its entirety.

BACKGROUND

Sprinkler systems can be provided in buildings to address fire conditions. Sprinkler systems can include fire protection sprinklers that connect with piping systems to receive fluid to address the fire conditions.

SUMMARY

At least one aspect relates to a fire suppression system. The fire suppression system includes a sprinkler, a pipe that provides fluid to the sprinkler, and a fitting. The sprinkler includes an inlet end that includes a protrusion defining a sprinkler interface and a base extending from the inlet end. The fitting extends from a first end that receives the pipe to a second end that includes a fitting interface. The inlet end of the sprinkler couples with the second end and the fitting interface of the fitting couples with the sprinkler interface. The fitting interface and the sprinkler interface limit rotation of the sprinkler relative to the fitting and form a fluid seal between the fitting and the sprinkler.

At least one aspect relates to a coupling assembly. The coupling assembly includes a sprinkler and a fitting. The sprinkler includes an inlet end defining a sprinkler interface on a protrusion. The fitting extends from a first end that receives the pipe to a second end that includes a fitting interface. The inlet end of the sprinkler couples with the second end and the fitting interface of the fitting couples with the sprinkler interface. The fitting interface and the sprinkler interface limit rotation of the sprinkler relative to the fitting and form a fluid seal between the fitting and the sprinkler.

At least one aspect relates to a sprinkler assembly. The sprinkler assembly can include a sprinkler and a fitting. The sprinkler can include at least one flange and a sprinkler interface coupled with the at least one flange. The fitting can extend from a first end to receive or coupled with a pipe to a second end that includes a fitting interface. The fitting interface connects with the sprinkler interface. The second end can abut the at least one flange to limit rotation of the sprinkler relative to the fitting.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

The present disclosure generally relates to a fire sprinkler. More particularly, the present disclosure relates to a fire sprinkler that includes a connection that can limit over tightening of the fire sprinkler into a pipe. Fire protection systems include sprinklers that can inhibit or permit flow of fluid (typically water, but in some applications fire suppressant fluid) depending upon conditions. In the instance of a fire or detected conditions that may be indicative of a fire (e.g., increased heat, smoke, etc.), the sprinklers can permit the flow of fluid such that the fluid may contact a deflector and be dispersed so as to provide exposure protection to a window and/or wall. The sprinklers may disperse water or fire protection fluid over a specific area, for example a portion of a room or hallway, or a window or wall. In order to accomplish fire exposure protection for a given area (e.g., room, hallway, window, wall, etc.), fire sprinklers couple with a piping system that directs fire suppressant from a source to the fire sprinklers. The fire sprinklers can selectively couple with the piping during installation of the fire suppression system. For example, fire sprinklers include threading that can interface with threading on the piping system to fluidly seal the fire sprinklers to the piping system.

During coupling of the fire sprinkler to the piping system, the fire sprinkler may be overtightened due to, for example, excess torque, threads failing, etc. Overtightening of the fire sprinklers within the piping system may cause the seal between the fire sprinklers and the piping system to break. Breaking of the seal may allow fire suppressant or pressure to leak from the piping and/or the fire sprinkler, causing insufficient protection to a specific area. Sprinklers and sprinkler components in accordance with the present disclosure can enable pipe coupling and sprinkler installation while mitigating issues associated with over torqueing.

Figure 1:
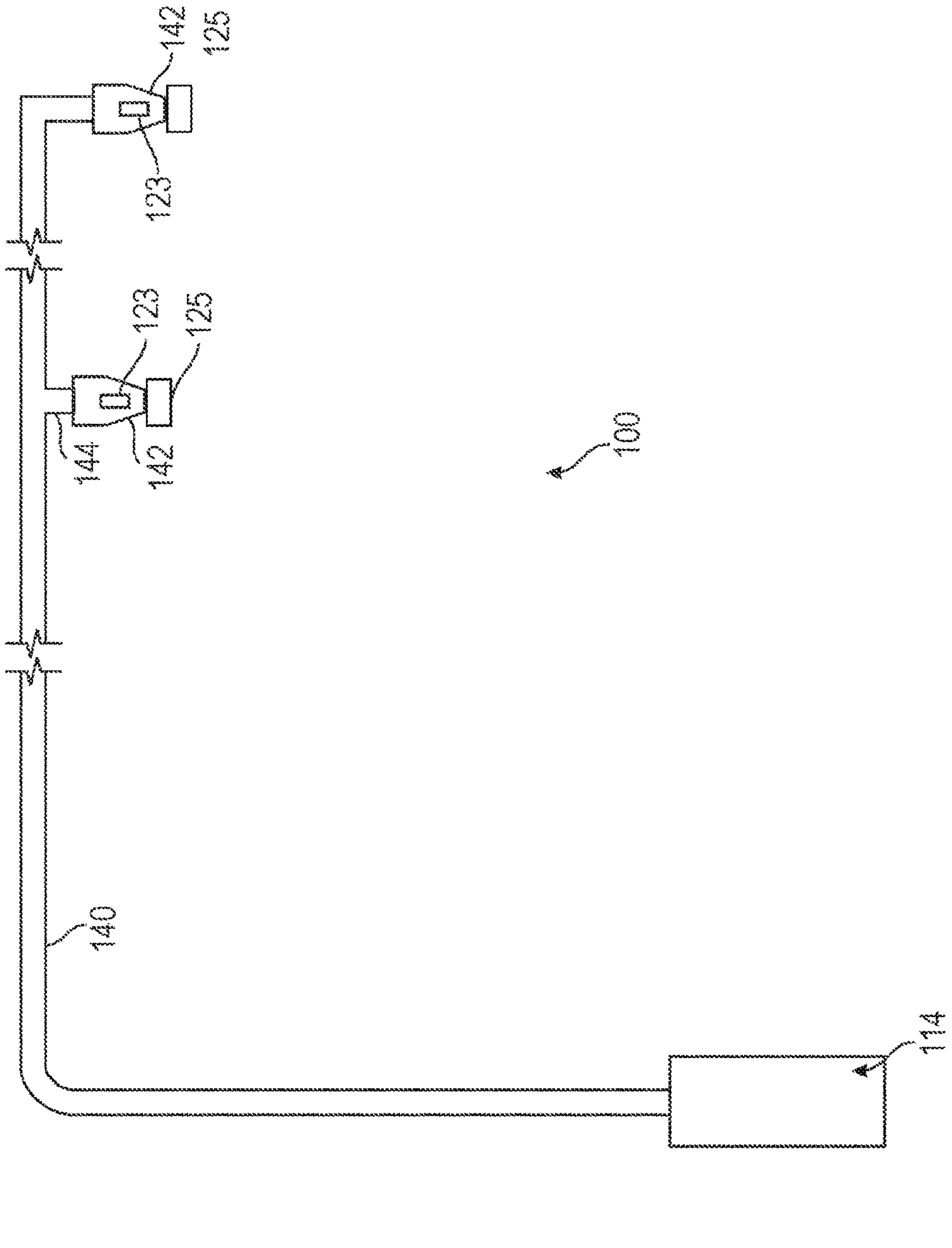
FIG. 1 is a fire suppression system.

FIG. 1 depicts a fire suppression system 100. The fire suppression system 100 can be a chemical fire suppression system. The fire suppression system 100 can distribute a fire suppressant agent onto or nearby a fire, extinguishing the fire and preventing the fire from spreading. The fire suppression system 100 can be used alone or in combination with other types of fire suppression systems (e.g., a building sprinkler system, a handheld fire extinguisher). Multiple fire suppression systems 100 can be used in combination with one another to cover a larger area (e.g., each in different rooms of a building).

The fire suppression system 100 can be used in a variety of applications. The fire suppression system 100 can be used with a variety of fire suppressant agents, including but not limited to water (e.g., may use powders, liquids, foams, or other fluid or flowable materials). The sprinkler and various other components of the system can be used for storage applications, including but not limited to use for ceiling-only systems, and for ceiling heights up to and over fifty five feet. For example, the system can be used for storage commodities such as Class I, II, III or IV, Group A, Group B, or Group C plastics, elastomers, or rubber commodities, or any combination thereof. The storage commodity can be in an arrangement such as a single-row rack arrangement, a double-row rack arrangement, a multi-row rack arrangement, a palletized arrangement, a solid-piled arrangement, a bin box arrangement, a shelf arrangement, a back-to-back shelf arrangement, an on floor arrangement, and a rack without solid shelves arrangement, or any combination thereof. The system can be used in accordance with various standards, such as standards set forth by the National Fire Protection Association (NFPA) or FM Global.

The fire suppression system 100 can include or be coupled with a fluid supply 114. The fluid supply 114 can define an internal volume filled (e.g., partially filled, completely filled) with fire suppressant agent. The fluid supply 114 can provide fluid from a remote location to a building in which the fire suppression system 100 is located. The fluid supply may include, for example, a municipal water supply, pump, piping system, tank, cylinder, or any other source of water or fire suppression agent.

Piping 140 (e.g., one or more pipes, tubes, conduits) can be fluidly coupled with one or more sprinklers 142. The piping 140 can include vertical pipes 144. The vertical pipes 144 can extend perpendicular from the piping 140. The sprinklers 142 can receive water or other fire suppressant agent from the fluid supply 114 via the piping 140 and the vertical pipes 144. The sprinklers 142 each define one or more outlets, through which the fire suppressant agent exits and contacts a deflector 125, such as to form a spray of water or other fire suppressant agent that covers a desired area. The sprays from the sprinklers 142 then suppress or extinguish fire within that area. The deflectors 125 of the sprinklers 142 can be shaped to control the spray pattern of the fire suppressant agent leaving the sprinklers 142. The sprinklers 142 can be used as concealed sprinklers, pendent sprinklers, upright sprinklers, water mist nozzles, or any other device for spraying fire suppressant agent.

The sprinklers 142 can include an activation element (e.g., thermal element) 123. The activation element 123 can change from a first state that prevents fluid flow out of the sprinkler 142 to a second state that permits fluid flow of the sprinkler 142 responsive to a fire condition. For example, the activation element 123 can include a glass bulb including a fluid that expands responsive to an increase in temperature (e.g., responsive to heat provided to the fluid from a fire), such as to cause the glass bulb to break responsive to the temperature meeting or exceeding a threshold temperature; the activation element 123 can include a fusible link that includes two or more pieces coupled using a solder than can melt responsive to the temperature meeting or exceeding a threshold temperature; the activation element 124 can include an electric actuator (e.g., an electrically triggered pyrotechnic actuator or electrically actuated bulb or link). The activation element 124 can have a response time index (RTI) less than or equal to 80 $(m/s)^{1/2}$, or less than or equal to 50 $(m/s)^{1/2}$.

The sprinklers 142 can be early suppression, fast response (ESFR) sprinklers. The sprinklers 142 can have K-factors greater than or equal to 14.0 $GPM/PSI^2$ and less than or equal to 36.0 $GPM/PSI^2$. The sprinklers 142 can be arranged (e.g., in a grid or tree arrangement over a storage commodity) to have sprinkler to sprinkler spacings greater than or equal to eight feet by eight feet and less than or equal to twelve feet by twelve feet.

Figure 2:
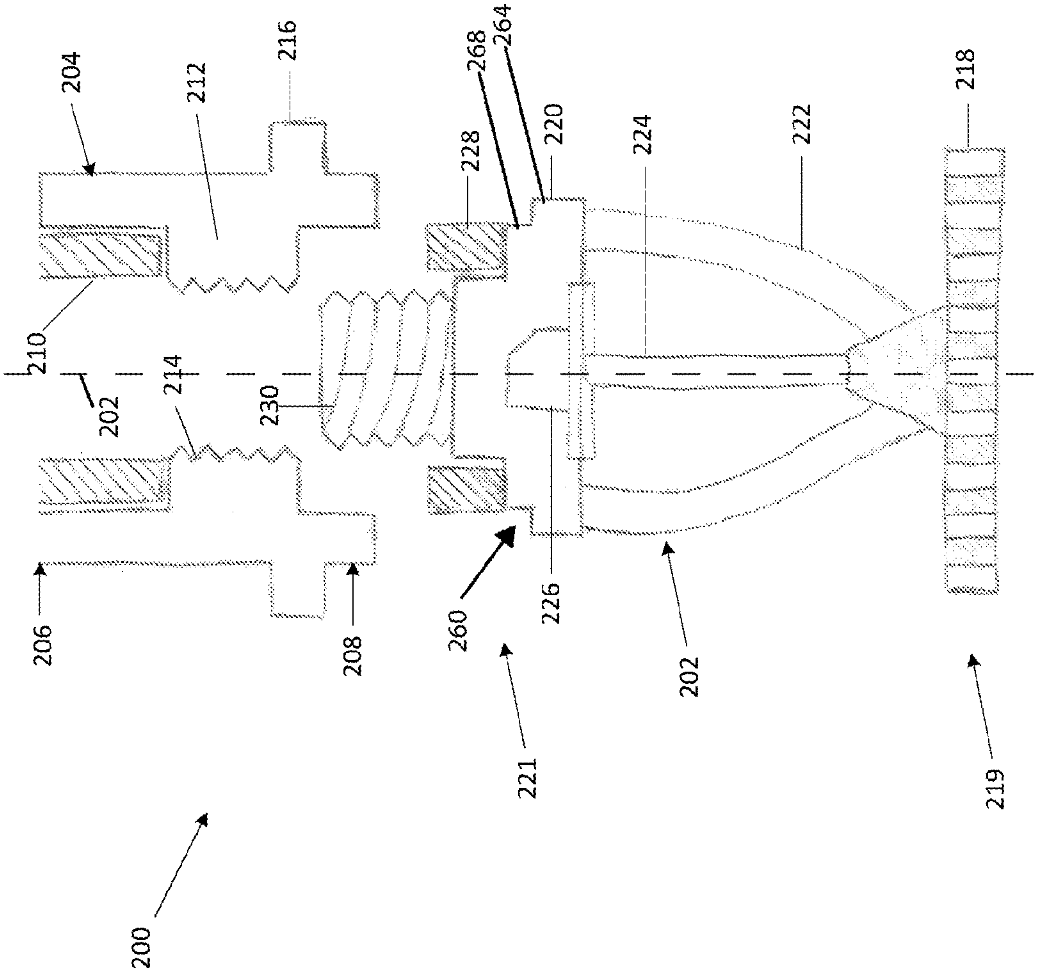
FIG. 2 is a cross-sectional view of a connection system for attaching a sprinkler to a pipe.

FIG. 2 depicts a connection system 200. The connection system 200 can incorporate features and components of the fire suppression system 100 described with reference to FIG. 1. The connection system 200 can be used for fire protection in various applications, including but not limited to storage applications. The connection system 200 includes a sprinkler 202. The sprinkler 202 can function in a similar manner as the sprinkler 142 (discussed above). The connection system 200 includes a pipe 204 (e.g., a fitting formed monolithically with or coupled with a pipe). The pipe 204 can couple with the fluid supply 114 and supply the sprinkler 202 with fluid. The pipe 204 can include the vertical pipe 144.

The pipe 204 includes a pipe inlet section 206 (which can form or be coupled with a first end of a fitting) and a pipe outlet section 208 (which can form or be coupled with a second end of the fitting). The pipe inlet section 206 can be on an opposite side of the pipe 204 from the pipe outlet section 208. The pipe inlet section 206 can be coupled with the piping 140. The pipe outlet section 208 can be coupled with the sprinkler 202. The pipe inlet section 206 of the pipe 204 can include a pipe seal 210 (e.g., gasket, 0-ring, sealing ring, sealant, etc.). The pipe seal 210 can be provided on an interior of the pipe 204. The pipe seal 210 can limit flow of fire suppressant from the pipe 204 during activation of the fire suppression system 100, and can interface with a portion of the sprinkler 202. The pipe 204 can include inward protrusion 212, which can have a smaller inner diameter than the pipe inlet section 206 and the pipe outlet section 208. The inward protrusion 212 can be positioned closer to the pipe outlet section 208 than the pipe seal 210. A fitting interface, such as pipe thread 214, can be positioned on the inward protrusion 212. The pipe thread 214 can interface with the sprinkler 202. The pipe 204 can include a pipe protrusion 216. The pipe protrusion 216 can define an interface region for a user to manipulate the pipe 204.

The sprinkler 202 interfaces with the pipe 204. The sprinkler 202 includes a deflector 218 positioned at a sprinkler outlet end 219. The deflector 218 receives a flow of fire suppressant and disperses the fire suppressant across a surface area (e.g., a hazard area, a fire, a heated object, etc.).

The sprinkler 202 includes a base 220. The base 220 can be a tapered body and include sections that have various diameters. For example, the base 220 can include at least one flange 260, such as a first flange 264, and a second flange 268 between the first flange 264 and the sprinkler thread 230. The first flange 264 can abut the pipe outlet section 208 to prevent overtightening of the sprinkler 202 with the pipe 204. The second flange 268 can have a lesser diameter than the first flange 264. The second flange 268 can receive a sprinkler seal 228 (e.g., gasket) between the second flange 268 and the pipe 204. The base 220 can include an aperture extending through the base 220. The aperture can direct flow of fire suppressant from the pipe 204 to the deflector 218.

The sprinkler 202 includes arms 222 (e.g., frame arms). The arms 222 space the deflector 218 from the base 220. The sprinkler 202 can include a activation element 224. The activation element 224 can be positioned between the arms 222 and can couple with the base 220 and the deflector 218. The activation element 224 can couple with a button 226 (e.g., seal, cap, etc.). The button 226 can be supported within the aperture in the base 220 by the activation element 224 and limit flow of fire suppressant through the base 220. The activation element 224 breaks (e.g., fractures, etc.) when a temperature in proximity of the activation element 224 meets or exceeds a threshold temperature, which can cause the button 226 to move to allow fire suppressant to release through the aperture.

The sprinkler 202 includes an inlet end 221, which can define a sprinkler interface, such as sprinkler thread 230. The sprinkler thread 230 extends from the base 220. The pipe thread 214 of the pipe 204 receives the sprinkler thread 230 of the sprinkler 202. The sprinkler thread 230 can be longer than the pipe thread 214 and a portion of the sprinkler thread 230 can couple with the pipe seal 210. A portion of the base 220 can be larger or equal to the diameter of the pipe 204 and be limited from entering the pipe 204. A middle portion of the base 220 and the sprinkler seal 228 can be sized to be received by the pipe 204 and larger than the inward protrusion 212. The geometry of the base 220 and the pipe 204 can limit tightening of the sprinkler 202 into the pipe 204. For example, a portion of the base 220 contacts the outermost diameter of the pipe 204, and the pipe seal 210 and the sprinkler seal 228 can facilitate fluidly sealing the first connection system when the sprinkler thread 230 and the pipe thread 214 are partially coupled. The pipe seal 210 seals a portion of the sprinkler thread 230 protruding inward from the pipe thread 214. The sprinkler seal 228 seals a portion of the sprinkler thread 230 protruding outward from the pipe thread 214.

Figure 3:
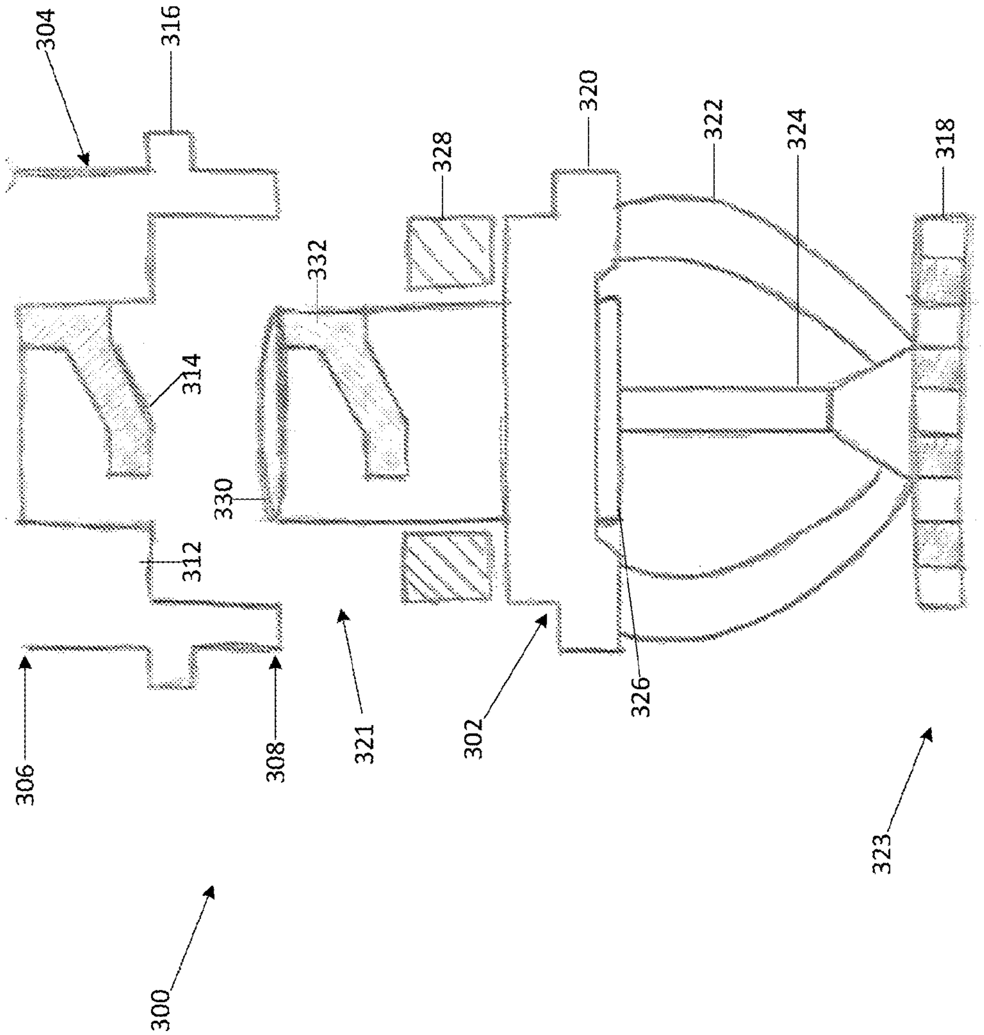
FIG. 3 is a cross-sectional view of a connection system for attaching a sprinkler to a pipe.

FIG. 3 depicts a connection system 300. The connection system 300 includes a sprinkler 302. The sprinkler 302 can incorporate features of and function in a similar manner as the sprinkler 142 (described with reference to FIG. 1). The connection system 300 includes a pipe 304. The pipe 304 can couple with the fluid supply 114 and supply the sprinkler 302 with fluid. The pipe 304 can include the vertical pipe 144.

The pipe 304 includes a pipe inlet section 306 and a pipe outlet section 308. The pipe inlet section 306 can be on an opposite side of the pipe 304 from the pipe outlet section 308. The pipe inlet section 306 can be coupled with the piping 140. The pipe outlet section 308 can be coupled with the sprinkler 302. The pipe 304 can include a section having an inner diameter less than that of the pipe inlet section 306 and the pipe outlet section 308, depicted as inner protrusion 312. The inner protrusion 312 can be positioned closer to the pipe outlet section 308 than the pipe inlet section 306. A fitting interface, such as pipe key 314, can be positioned on the inner protrusion 312. The pipe key 314 can interface with the sprinkler 302. The pipe key 314 can include at least one of an angled surface, a surface parallel to the pipe 304 and a surface perpendicular to the pipe 304. The pipe 304 can include a pipe protrusion 316. The pipe protrusion 316 can define an interface region for a user to manipulate the pipe 304.

The sprinkler 302 interfaces with the pipe 304. The sprinkler 302 includes a deflector 318 positioned at a sprinkler outlet end 323. The deflector 318 receives a flow of fire suppressant and disperses the fire suppressant across a surface area (e.g., a hazard area, a fire, a heated object, etc.). The sprinkler 302 includes a base 320. The base 320 can be a tapered body and include sections of various diameters. A taper of the base 320 can interface with the pipe 304 and another taper receives a sprinkler seal 328. The base 320 can include an aperture extending through the base 320. The aperture can direct flow of fire suppressant from the pipe 304 to the deflector 318. The sprinkler 302 includes arms 322. The arms 322 space the deflector 318 from the base 320. The sprinkler 302 can include a activation element 324. The activation element 324 can be positioned between the arms 322 and can couple with the base 320 and the deflector 318. The activation element 324 can couple with a button 326 (e.g., seal, cap, etc.). The button 326 can held within the aperture in the base 320 by the activation element 324 and limit flow of fire suppressant through the base 320. The activation element 324 breaks (e.g., fractures, etc.) when a temperature in proximity of the activation element 324 meets or exceeds a threshold temperature, which can cause the button 326 to move to allow fire suppressant to release through the aperture.

The sprinkler 302 includes a sprinkler protrusion 330 extending away from the base 320, to define a sprinkler inlet end 321, opposite the sprinkler outlet end 323. The sprinkler protrusion 330 can have a diameter smaller than that of the pipe 304 and be received by pipe 304. The sprinkler protrusion 330 can include or define a sprinkler interface, such as a groove 332. The groove 332 can extend partially or fully through the sprinkler protrusion 330 to define an aperture. The groove 332 can include one or more of a portion parallel to the sprinkler protrusion 330, a portion perpendicular to the sprinkler protrusion 330, and an angled portion relative to the sprinkler protrusion 330.

The inner protrusion 312 of the pipe 304 is sized to receive the sprinkler protrusion 330 of the sprinkler 302. A portion of the base 320 and the sprinkler seal 328 can be sized to be larger than the inner protrusion 312 and smaller than the pipe 304 diameter. The groove 332 of the sprinkler 302 receives the pipe key 314 of the pipe 304 and the sprinkler 302 can be rotated relative to the pipe 304 to couple the pipe key 314 to the groove 332, coupling the sprinkler 302 and the pipe 304. The sprinkler seal 328 can form a seal between the sprinkler 302 and the pipe 304 and can exert a force on the sprinkler 302 to limit decoupling of the pipe key 314 from the groove 332. The geometry of the pipe key 314 and the groove 332 can limit rotation of the sprinkler 302 relative to the pipe 304 while coupling the pipe 304 and sprinkler 302.

Figure 4:
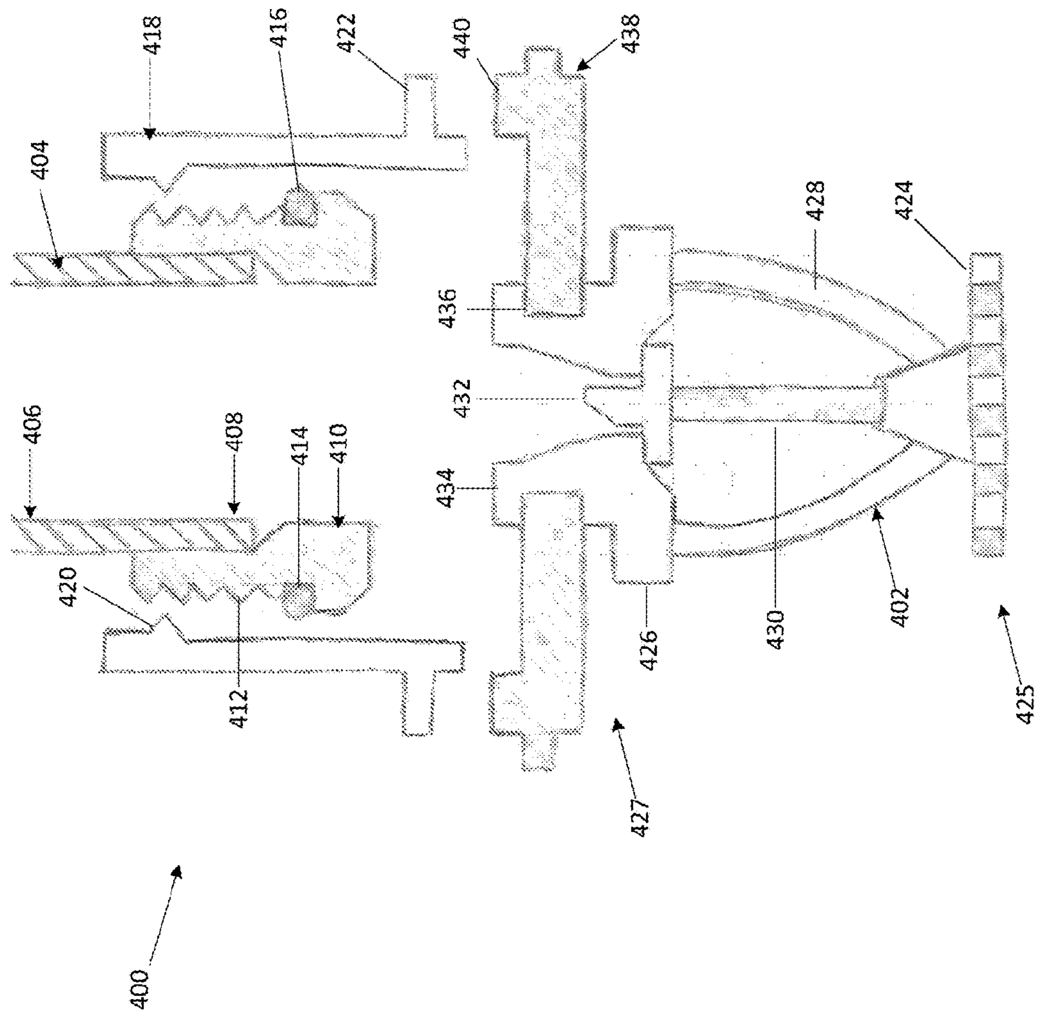
FIG. 4 is a cross-sectional view of a connection system for attaching a sprinkler to a pipe.

FIG. 4 depicts a connection system 400. The connection system 400 includes a sprinkler 402. The sprinkler 402 can incorporate features of and function in a similar manner as the sprinkler 142 (described with reference to FIG. 1). The connection system 400 can include a pipe 404. The pipe 404 can couple with the fluid supply 114 and supply the sprinkler 402 with fluid. The pipe 404 can include the vertical pipe 144.

The pipe 404 includes a pipe inlet section 406 and a pipe outlet section 408. The pipe inlet section 406 being opposite the pipe outlet section 408. The pipe inlet section 406 can be coupled with the piping 140. The pipe outlet section 408 can be coupled with the sprinkler 402. The connection system 400 includes a grooved body 410 (e.g., a fitting, etc.). The grooved body 410 can be an annular shape and sized larger than a diameter of the pipe 404 to receive the pipe 404. The pipe 404 and the grooved body 410 can be fixedly coupled (e.g., adhesive, threading, fasteners, etc.). The grooved body 410 can include an interface, such as grooved body threads 412 positioned on a side opposite the side coupled with the pipe 404. The grooved body 410 can include a sealing groove 414 positioned at an end of the grooved body threads 412. The sealing groove 414 can receive a seal 416 (e.g., O-ring, etc.). The grooved body 410 can include a region with a diameter smaller or equal to the pipe 404 to limit varying speeds of fire suppressant flowing through the connection system 400.

The connection system 400 can include an annular body 418. The annular body 418 can have a diameter larger than the grooved body 410 and receive the grooved body 410. The annular body 418 can include an interface, such as an annular body thread 420. The annular body thread 420 can be positioned at an inner side on a first end of the annular body 418. The annular body thread 420 can interface with the grooved body threads 412 to selectively couple the annular body 418 to the grooved body 410. The annular body 418 can include an annular body protrusion 422. The annular body protrusion 422 can be positioned on an opposite side and opposite end relative to the annular body thread 420. The annular body protrusion 422 can extend perpendicularly away from the annular body 418.

The sprinkler 402 interfaces with the pipe 404. The sprinkler 402 can include a deflector 424 positioned at a sprinkler outlet end 425. The deflector 424 receives a flow of fire suppressant and disperses the fire suppressant across a surface area (e.g., a hazard area, a fire, a heated object, etc.). The sprinkler 402 includes a base 426. The base 426 can be a tapered body and include sections of various diameters. The base 426 can include an aperture extending through. The aperture can direct flow of fire suppressant from the pipe 404 to the deflector 424. The sprinkler 402 can include arms 428 (e.g., frame arms). The arms 428 can space the deflector 424 from the base 426. The sprinkler 402 can include a activation element 430. The activation element 430 can be positioned between the arms 428 and can couple with the base 426 and the deflector 424. The activation element 430 can couple with a button 432 (e.g., seal, cap, etc.). The button 432 can be held within the aperture in the base 426 by the activation element 430 and limit flow of fire suppressant through the base 426. The activation element 430 breaks (e.g., fractures, etc.) when a temperature in proximity of the activation element 430 meets or exceeds a threshold temperature, which can cause the button 432 to move to allow fire suppressant to release through the aperture.

The sprinkler 402 can include a sprinkler protrusion 434. The sprinkler protrusion 434 can extend from the base 426, to define a sprinkler inlet end 427, on an opposite side of the sprinkler 402 than the sprinkler outlet end. The sprinkler protrusion 434 can include a sprinkler groove 436. The sprinkler groove 436 can receive a sprinkler flange 438. The sprinkler flange 438 can be removable from the sprinkler 402 or can be fixed to the sprinkler 402. The sprinkler flange 438 can include a flange protrusion 440. The flange protrusion 440 can extend in the same direction as the sprinkler protrusion 434. The flange protrusion 440 can be positioned to define a cavity within the sprinkler flange 438 that can receive a portion of the annular body 418.

In an assembled configuration, the grooved body 410 can be coupled with the outer surface of the pipe 404 via, for example, adhesive. The sprinkler flange 438 can be coupled with the sprinkler groove 436. The sprinkler flange 438 can receive the annular body 418 between the flange protrusion 440. The annular body protrusion 422 can define a coupling surface for the flange protrusion 440 to couple with. An adhesive may be used to fixedly couple the annular body 418 to the sprinkler flange 438. The annular body thread 420 can be received by the grooved body threads 412 and rotated to position the sprinkler 402 relative to the pipe 404. The seal 416 can interface with an inner side of the annular body 418 and form a fluid seal between the sprinkler 402 and the pipe 404.

Figure 5:
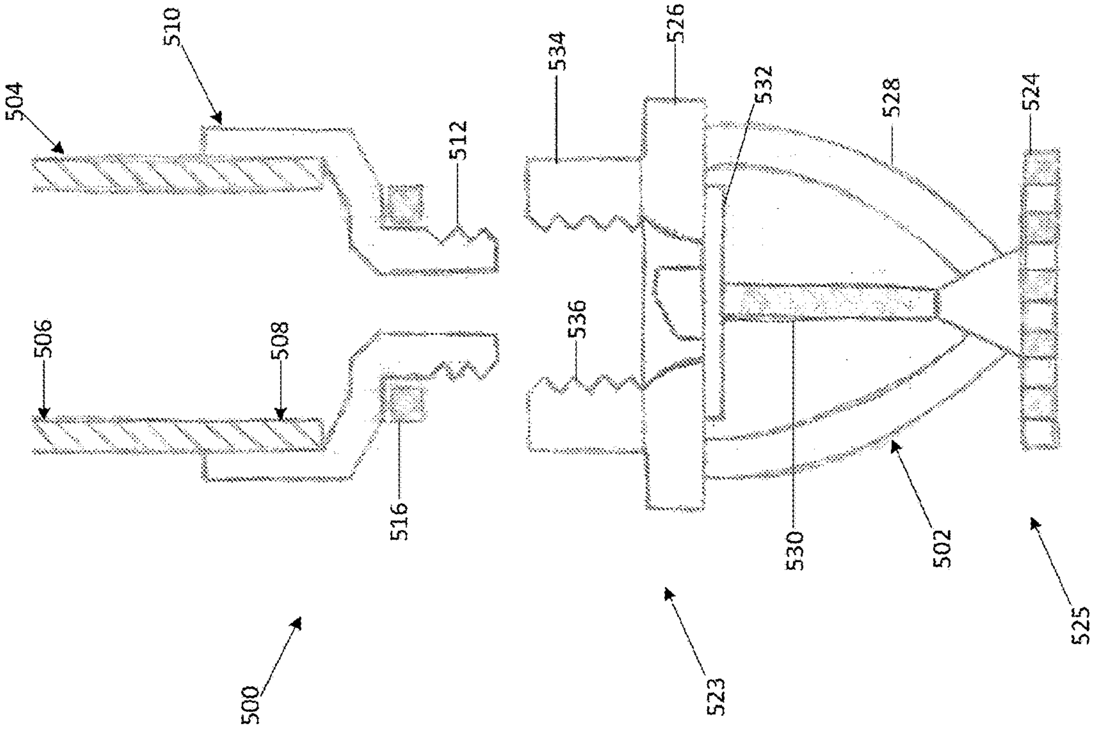
FIG. 5 is a cross-sectional view of a connection system for attaching a sprinkler to a pipe.

FIG. 5 depicts a connection system 500. The connection system 500 includes a sprinkler 502. The sprinkler 502 can incorporate features of and function in a similar manner as the sprinkler 142 (described with reference to FIG. 1). The connection system 500 can include a pipe 504. The pipe 504 can couple with the fluid supply 114 and supply the sprinkler 502 with fluid. The pipe 504 can include the vertical pipe 144.

The pipe 504 includes a pipe inlet section 506 and a pipe outlet section 408. The pipe inlet section 506 can be on an opposite side of the pipe 504 from the pipe outlet section 508. The pipe inlet section 506 can be coupled with the piping 140.

The connection system 500 includes a grooved body 510 (e.g., a fitting, etc.). The grooved body 510 can have an annular shape and sized larger than a diameter of the pipe 504 to receive the pipe 504. The pipe outlet section 508 of the pipe 504 and the grooved body 510 can be fixedly coupled (e.g., adhesive, threading, fasteners, etc.). The grooved body 510 can include an interface, such as grooved body threads 512 positioned on a side opposite the side coupled with the pipe 504. A seal 516 (e.g., 0-ring, etc.) can couple with the grooved body 510 near the grooved body threads 512. The grooved body 510 can include a region with a diameter smaller or equal to the pipe 504 positioned on a section of the grooved body 510 extending from the pipe 504. The grooved body threads 512 can be positioned on the region having the smaller diameter.

The sprinkler 502 can interface with the grooved body 510. The sprinkler 502 includes a deflector 524 positioned at a sprinkler outlet end 525. The deflector 524 receives a flow of fire suppressant and disperses the fire suppressant across a surface area (e.g., a hazard area, a fire, a heated object, etc.). The sprinkler 502 includes a base 526. The base 526 can include an aperture extending through. The aperture can direct flow of fire suppressant from the pipe 504 to the deflector 524. The sprinkler 502 includes arms 528 (e.g., frame arms). The arms 528 space the deflector 524 from the base 526. The sprinkler 502 can include a activation element 530. The activation element 530 is positioned between the arms 528 and couples with the base 526 and the deflector 524. The activation element 530 can couple with a button 532 (e.g., seal, cap, etc.). The button 532 can held within the aperture in the base 520 by the activation element 530 and limit flow of fire suppressant through the base 526. The activation element 530 breaks (e.g., fractures, etc.) when a temperature in proximity of the activation element 530 meets or exceeds a threshold temperature, which can cause the button 532 to move to allow fire suppressant to release through the aperture.

The sprinkler 502 can include a sprinkler protrusion 534. The sprinkler protrusion 534 can extend from the base 526, to define a sprinkler inlet end 523, on an opposite side of the sprinkler 502 than the sprinkler outlet end 525. The sprinkler protrusion 534 can include an interface, such as a sprinkler thread 536. The sprinkler thread 536 can be positioned on an inner side of the sprinkler protrusion 534.

In an assembled configuration, the grooved body 510 can be coupled with the outer surface of the pipe outlet section 508 of the pipe 504 via, for example, adhesive. The sprinkler 502 can receive a portion of the grooved body 510; for example, the sprinkler thread 536 can interface with the grooved body threads 512. The seal 516 interfaces with the sprinkler protrusion 534 and the grooved body 510 to form a fluid seal between the sprinkler 502 and the pipe 504. The sprinkler thread 536 can extend less than a length of the grooved body threads 512 such that the grooved body threads 512 couple with an unthreaded region of the sprinkler protrusion 534.

Figure 6:
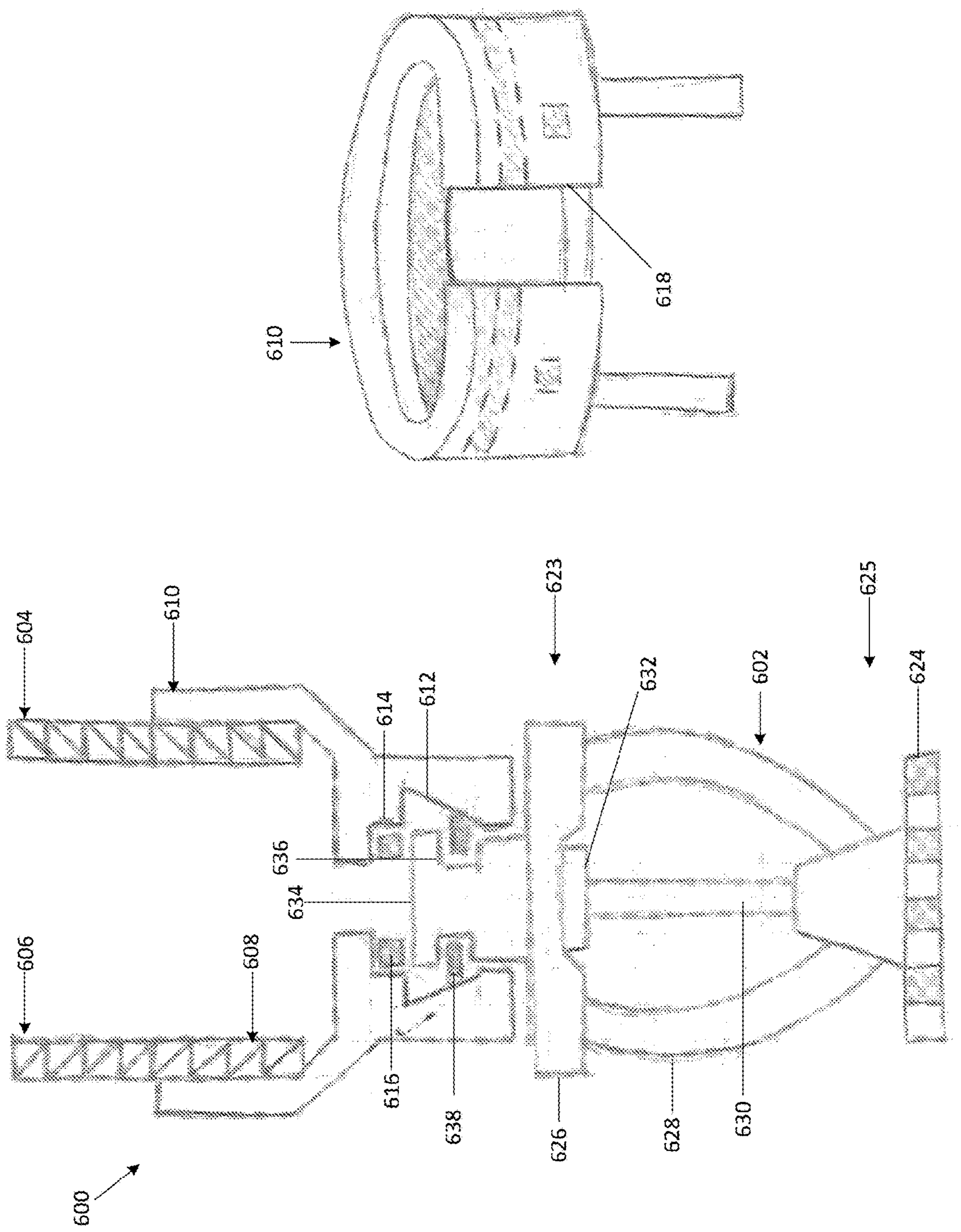
FIG. 6 is a cross-sectional view of a connection system for attaching a sprinkler to a pipe.

FIG. 6 depicts a connection system 600. The connection system 600 includes a sprinkler 602. The sprinkler 602 can incorporate features of and function in a similar manner as the sprinkler 142 (discussed above). The connection system 600 can include a pipe 604. The pipe 604 can couple with the fluid supply 114 and supply the sprinkler 602 with fluid. The pipe 604 can include the vertical pipe 144.

The pipe 604 includes a pipe inlet section 606 and a pipe outlet section 408. The pipe inlet section 606 can be on an opposite side of the pipe 604 from the pipe outlet section 608. The pipe inlet section 606 can be coupled with the piping 140.

The connection system 600 includes a coupling body 610 (e.g., a fitting, etc.). The coupling body 610 can have an annular shape. A portion of the annular body can be sized larger than a diameter of the pipe 604 to receive the pipe 604 and another portion of the coupling body 610 can be smaller than the diameter of the pipe to couple with the sprinkler 602. The pipe outlet section 608 of pipe 604 and the coupling body 610 can be fixedly coupled (e.g., adhesive, threading, fasteners, etc.). The coupling body 610 can include a larger aperture and a smaller aperture positioned on the smaller diameter section. The smaller aperture can include interface features such as at least one of an angled portion 612 and a sealing step 614. The sealing step 614 can receive a seal 616. The coupling body 610 can include a gap 618. The diameter of the coupling body 610 can be increased by increasing the gap 618 and decreased by decreasing the gap 618. The coupling body 610 can include an attachment feature (e.g., a latch, a lock, etc.) to eliminate the gap 618 and hold the coupling body 610 in a closed configuration.

The sprinkler 602 interfaces with the pipe 604. The sprinkler 602 includes a deflector 624 positioned at a sprinkler outlet end. The deflector 624 receives a flow of fire suppressant and disperses the fire suppressant across a surface area (e.g., a hazard area, a fire, a heated object, etc.). The sprinkler 602 includes a base 626. The base 626 can include an aperture extending through. The aperture can direct flow of fire suppressant from the pipe 604 to the deflector 624. The sprinkler 602 includes arms 628 (e.g., frame arms). The arms 628 can space the deflector 624 from the base 626. The sprinkler 602 can include a activation element 630. The activation element 630 can be positioned between the arms 628 and can couple with the base 626 and the deflector 624. The activation element 630 can couple with a button 632 (e.g., seal, cap, etc.). The button 632 can held within the aperture in the base 626 by the activation element 630 and limit flow of fire suppressant through the base 626. The activation element 630 breaks (e.g., fractures, etc.) when a temperature in proximity of the activation element 630 meets or exceeds a threshold temperature, which can cause the button 632 to move to allow fire suppressant to release through the aperture.

The sprinkler 602 can include a sprinkler protrusion 634. The sprinkler protrusion 634 can extend from the base 626, to define a sprinkler inlet end 623, on an opposite side of the sprinkler 602 from the sprinkler outlet end 625. The sprinkler protrusion 634 includes a sprinkler interface, such as sprinkler groove 636. The sprinkler groove 636 can receive a sprinkler seal 638.

In an assembled configuration, the coupling body 610 can receive a portion of the pipe outlet section 608 of the pipe 604. The seal 616 can be placed within the smaller aperture of the coupling body 610, such as on the sealing step 614. The distance of the gap 618 can be increased to allow the sprinkler protrusion 634 to enter the coupling body 610. The gap 618 can be reduced (e.g., eliminated, etc.) to limit the movement of the sprinkler 602 relative to the coupling body 610. The seal 616 and the sprinkler seal 638 can form a fluid seal between the sprinkler 602, the coupling body 610, and the pipe 604. An adhesive (e.g., epoxy, solder, welding, etc.) may be used to couple the coupling body 610 to the pipe 604 and to couple the coupling body 610 to reduce the gap 618.

Figure 7:
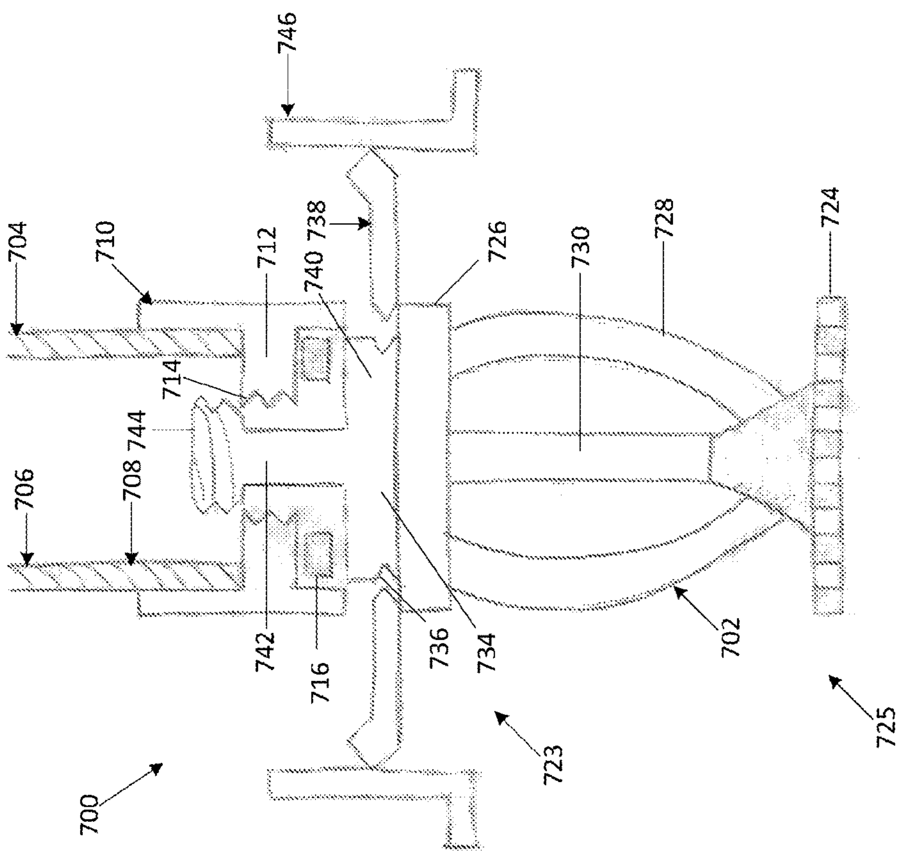
FIG. 7 is a cross-sectional view of a connection system for attaching a sprinkler to a pipe.

FIG. 7 depicts a connection system 700. The connection system 700 includes a sprinkler 702. The sprinkler 702 can incorporate features of and function in a similar manner as the sprinkler 142 (described with reference to FIG. 1). The connection system 700 can include a pipe 604. The pipe 704 can couple with the fluid supply 114 and supply the sprinkler 702 with fluid. The pipe 704 can include the vertical pipe 144.

The pipe 704 includes a pipe inlet section 706 and a pipe outlet section 708. The pipe inlet section 706 can be on an opposite side of the pipe 704 from the pipe outlet section 708. The pipe inlet section 706 can be coupled with the piping 140.

The connection system 700 includes a coupling body 710 (e.g., a fitting, etc.). The coupling body 710 can have an annular shape. A portion of the annular body can be sized larger than a diameter of the pipe 704 to receive the pipe 704. The pipe outlet section 708 of pipe 704 and the coupling body 710 can be fixedly coupled (e.g., adhesive, threading, fasteners, etc.).

The coupling body 710 can include an inner flange 712. The inner flange 712 can define a section having a relatively lesser inner diameter relative to other portions of the coupling body 710. The inner flange 712 can define an interface, such as coupling body threading 714 on an innermost portion of the inner flange 712. The pipe 704 can interface with the inner flange 712 and is limited from further movement into the coupling body 710 by the inner flange 712. A seal 716 can be provided on the opposite side of the inner flange 712 as the pipe 704.

The sprinkler 702 interfaces with the pipe 704. The sprinkler 702 includes a deflector 724 positioned at a sprinkler outlet end. The deflector 724 receives a flow of fire suppressant and disperses the fire suppressant across a surface area (e.g., a hazard area, a fire, a heated object, etc.). The sprinkler 702 includes a base 726. The base 726 can include an aperture extending through. The aperture can direct flow of fire suppressant from the pipe 704 to the deflector 724. The sprinkler 702 includes arms 728 (e.g., frame arms). The arms 728 can space the deflector 724 from the base 726. The sprinkler 702 can include a activation element 730. The activation element 730 can be positioned between the arms 728 and can couple with the base 726 and the deflector 724. The activation element 730 can couple with a button 732 (e.g., seal, cap, etc.). The button 732 can held within the aperture in the base 726 by the activation element 730 and limit flow of fire suppressant through the base 726. The activation element 730 breaks (e.g., fractures, etc.) when a temperature in proximity of the activation element 730 meets or exceeds a threshold temperature, which can cause the button 732 to move to allow fire suppressant to release through the aperture.

The sprinkler 702 can include a sprinkler protrusion 734. The sprinkler protrusion 734 can extend from the base 726, to define a sprinkler inlet end 723, from an opposite side of the sprinkler 702 relative to a sprinkler outlet end 725. The sprinkler protrusion 734 includes a first portion 740 and a second portion 742. The first portion 740 can be larger (e.g., larger diameter, etc.) than the second portion 742. The first portion 740 can be located closer to the base 726 than the second portion 742. The first portion 740 can be sized to be received by the coupling body 710. The sprinkler protrusion 734 can include an interface, such as a sprinkler groove 736 on the first portion 740. The sprinkler groove 736 can removably couple with a sprinkler flange 738. The sprinkler flange 738 can interface with an external body 746. The second portion 742 can be sized to be received by the inner flange 712. The second portion 742 can include an interface, such as sprinkler threading 744.

In an assembled configuration, the coupling body 710 receives the pipe 704 and the pipe 704 interfaces with the inner flange 712. The seal 716 can be provided on an opposite side of the inner flange 712 relative to the pipe 704. The sprinkler 702 can be coupled with the coupling body 710. For example, the sprinkler threading 744 can be coupled with the coupling body threading 714. The sprinkler threading 744 can be sized to at least partially from the coupling body threading 714. For example, the sprinkler threading 744 can be rotated into the coupling body threading 714 and rotated further until the sprinkler threading 744 decouples from the coupling body threading 714 and is disposed within the pipe 704. The coupling body threading 714 can connect with a section of the second portion 742 of the sprinkler protrusion 734 without threading. The seal 716 can connect with the inner flange 712 and the first portion 740 of the sprinkler protrusion 734 to form a seal between the pipe 704, the coupling body 710, and the sprinkler 702.

Figure 8:
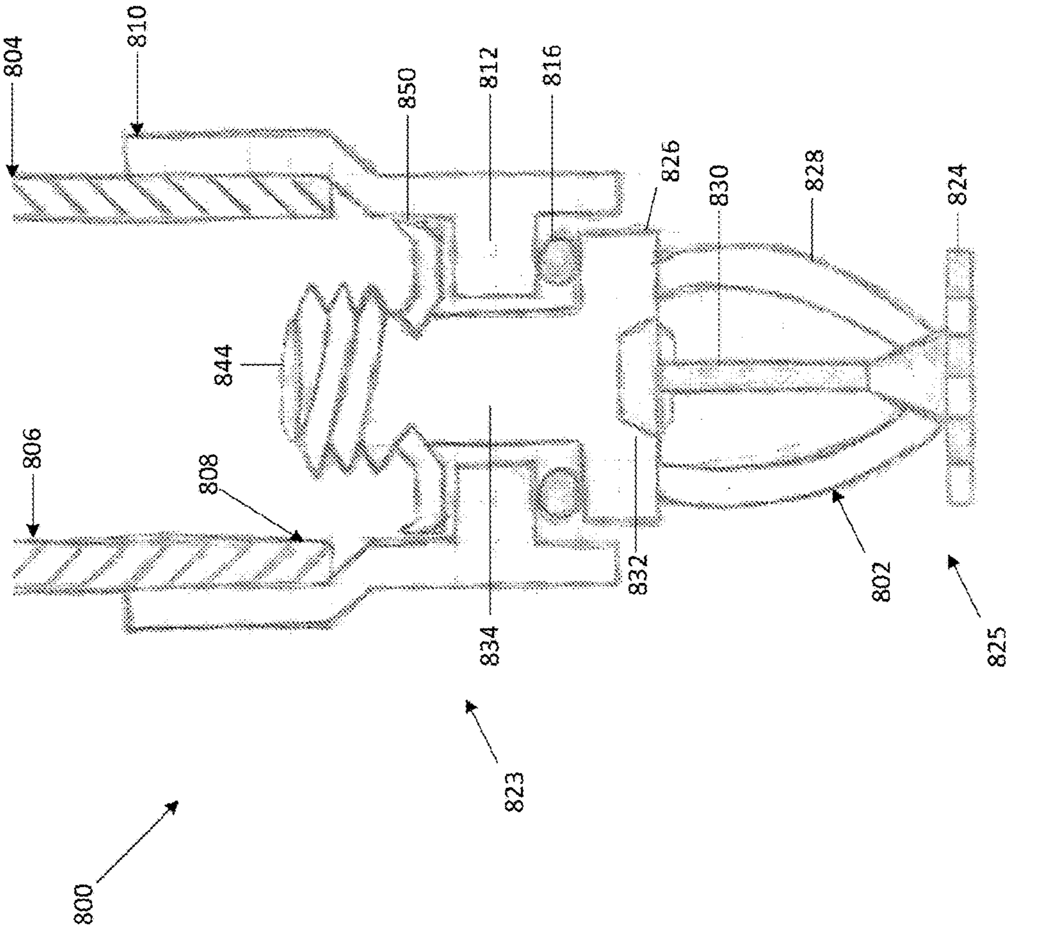
FIG. 8 is a cross-sectional view of a connection system for attaching a sprinkler to a pipe.

FIG. 8 depicts a connection system 800. The connection system 800 includes a sprinkler 802. The sprinkler 802 can function in a similar manner as the sprinkler 142 (described with reference to FIG. 1). The connection system 800 can include a pipe 804. The pipe 804 can couple with the fluid supply 114 and supply the sprinkler 802 with fluid. The pipe 804 can include the vertical pipe 144.

The pipe 804 includes a pipe inlet section 806 and a pipe outlet section 408. The pipe inlet section 806 can be on an opposite side of the pipe 804 from the pipe outlet section 808. The pipe inlet section 806 can be coupled with the piping 140.

The connection system 800 includes a coupling body 810 (e.g., a fitting, etc.). The coupling body 810 can have an annular shape. The coupling body 810 includes a first diameter section and a second diameter section. The first diameter section can be sized to receive the pipe 804 and the second diameter section can be sized to limit movement of the pipe 804 further into the coupling body 810. The pipe outlet section 808 of pipe 804 and the coupling body 810 can be fixedly coupled (e.g., adhesive, threading, fasteners, etc.). The coupling body 810 can include an inner flange 812 positioned within the smaller diameter section. The inner flange 812 can define the smaller inner diameter section of the coupling body 810.

The connection system 800 can include an interface, such as a ring 850. The ring 850 can define a threading and is coupled with an inner side of the inner flange 812. The pipe 804 can connect with the inner flange 812 and can be limited from further movement into the coupling body 810 by the inner flange 812. A seal 816 can be provided on the opposite side of the inner flange 812 as the pipe 804.

The sprinkler 802 interfaces with the pipe 804. The sprinkler 802 includes a deflector 824 positioned at a sprinkler outlet end. The deflector 824 receives a flow of fire suppressant and disperses the fire suppressant across a surface area (e.g., a hazard area, a fire, a heated object, etc.). The sprinkler 802 includes a base 826. The base 826 can be sized to be received by the coupling body 810. The base 826 can include an aperture extending through. The aperture can direct flow of fire suppressant from the pipe 804 to the deflector 824. The sprinkler 802 includes arms 828 (e.g., frame arms). The arms 828 can space the deflector 824 from the base 826. The sprinkler 802 can include a activation element 830. The activation element 830 can be positioned between the arms 828 and can couple with the base 826 and the deflector 824. The activation element 830 can couple with a button (e.g., seal, cap, etc.). The button can held within the aperture in the base 826 by the activation element 830 and limit flow of fire suppressant through the base 826. The activation element 830 breaks (e.g., fractures, etc.) when a temperature in proximity of the activation element 830 meets or exceeds a threshold temperature, which can cause the button to move to allow fire suppressant to release through the aperture.

The sprinkler 802 can include a sprinkler protrusion 834. The sprinkler protrusion 834 can extend from the base 826, to define a sprinkler inlet end 823, from an opposite side of the sprinkler 802 from a sprinkler outlet end 825. The sprinkler protrusion 834 can be sized to be received by the inner flange 812. The sprinkler protrusion 834 can include an interface, such as sprinkler threading 844.

In an assembled configuration, the coupling body 810 can receive the pipe 804 and the pipe 804 can connect with the inner flange 812. The seal 816 can be provided on an opposite side of the inner flange 812 relative to the pipe 804. The sprinkler 802 can be coupled with the coupling body 810. Specifically, the sprinkler threading 844 is coupled with the ring 850, which acts as a threading. The inner flange 812 may be sized to receive the sprinkler protrusion 834 through. For example, the sprinkler threading 844 can be received through the inner flange 812 and connect with the ring 850. The sprinkler 802 can be rotated until the sprinkler threading 844 decouples from the ring 850 and is disposed within the pipe 804. The ring 850 can connect with a section of the sprinkler protrusion 834 without threading. The seal 816 can engage the inner flange 812 the sprinkler protrusion 834 to form a seal between the pipe 804, the coupling body 810, and the sprinkler 802.

As utilized herein, the terms “approximately,” “about,” “substantially”, and similar terms are intended to include any given ranges or numbers +/−10%. These terms include insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled with each other using a separate intervening member and any additional intermediate members coupled with one another, or with the two members coupled with each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

The term “or,” as used herein, is used in its inclusive sense (and not in its exclusive sense) so that when used to connect a list of elements, the term “or” means one, some, or all of the elements in the list. Conjunctive language such as the phrase “at least one of X, Y, and Z,” unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

The construction and arrangement of the fitting assembly as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A coupling assembly, comprising:

a sprinkler comprising:

a base comprising a first flange and a second flange;

a deflector;

arms that are contiguous with and integrally formed with the base and that space the deflector from the base;

an activation element between the arms; and an inlet end defining a sprinkler thread on a protrusion contiguous with the base and extending along an axis from the base in a direction away from the arms, the second flange having a greater diameter than the protrusion, the first flange between the sprinkler thread and the arms, the second flange between the first flange and the protrusion;

a sprinkler seal engaged with the second flange, the sprinkler seal radially outward from the protrusion relative to the axis and radially inward from the first flange relative to the axis;

a fitting that extends from a first end to a second end, the second end comprising a fitting thread, the inlet end of the sprinkler couples with the second end and the fitting thread couples with the sprinkler thread, the first flange arranged to abut the second end such that the first flange, the fitting thread, and the sprinkler thread limit over rotation of the sprinkler relative to the fitting; and a fitting seal on an inner surface of the fitting, the sprinkler thread sized to couple with the fitting seal.

2. The coupling assembly of claim 1, comprising:

the sprinkler thread is on an outside surface of the protrusion, the protrusion extends into the second end.

3. The coupling assembly of claim 1, comprising:

the second end of the fitting comprises a step and an angled portion, the fitting comprises a gap extending from the first end to the second end; and the protrusion of the sprinkler comprises a sprinkler groove that receives a first seal, the protrusion of the sprinkler is received into the second end via the gap.

4. The coupling assembly of claim 1, comprising:

a flange coupled with the sprinkler;

an external body coupled with the flange;

a fitting thread defined on an inner surface of the fitting;

a sprinkler thread defined on a portion of the protrusion; and a seal provided on the sprinkler, the sprinkler thread extends less than a length of the fitting thread such that in an assembled configuration, the fitting thread couples with an unthreaded region of the protrusion.

5. The coupling assembly of claim 1, comprising:

a flange interfacing with a notch in the sprinkler;

an external body interfacing with the flange and an external object; and a ring coupled with the fitting thread and defining a ring.

6. A sprinkler assembly, comprising:

a sprinkler comprising a first flange, a second flange, a deflector, arms that are contiguous with and integrally formed with the first flange, the arms space the deflector from the first flange, an activation element between the arms, and a sprinkler thread coupled with the second flange, the first flange between the sprinkler thread and the arms, the second flange having a greater diameter than the sprinkler thread, the second flange between the first flange and the sprinkler thread, the sprinkler thread extending along an axis from the second flange in a direction away from the arms;

a sprinkler seal engaged with the second flange, the sprinkler seal radially outward from the sprinkler thread relative to the axis;

a fitting that extends from a first end to receive or coupled with a pipe to a second end comprising a fitting thread, the fitting thread connects with the sprinkler thread, the second end to abut the first flange to limit rotation of the sprinkler relative to the fitting; and a fitting seal on an inner surface of the fitting, the sprinkler thread sized to couple with the fitting seal.

7. The sprinkler assembly of claim 6, comprising:

the second end of the fitting comprises a step and an angled portion, and the fitting comprises a gap extending from the first end to the second end.

8. The coupling assembly of claim 1, comprising:

the fitting comprises an inward protrusion on which the fitting thread is formed; and the fitting comprises an outer surface and a pipe protrusion extending outward from the outer surface.

9. The coupling assembly of claim 1, comprising:

the sprinkler thread defines a terminal end along the axis of the sprinkler.

* * * * *